Patented Feb. 12, 1946

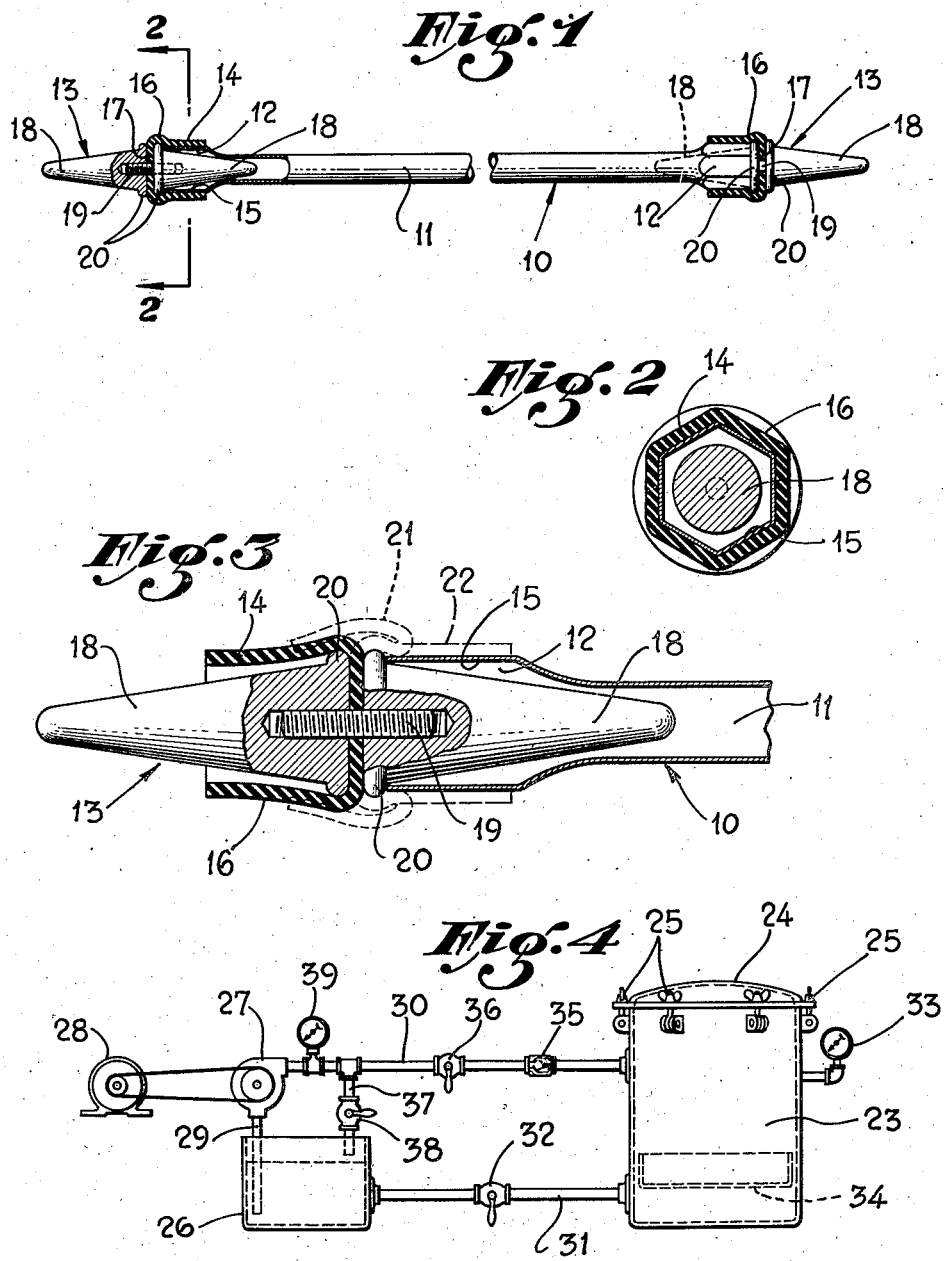
Feb. 12, 1946. W. G. ROMMEL 2,394,875
METHOD AND MEANS FOR TESTING TUBES
Filed June 21, 1943
Inventor:
WILLIAM G. ROMMEL,
Attorney.

2,394,875

UNITED STATES PATENT OFFICE 2,394,875

METHOD AND MEANS FOR TESTING TUBES

William G. Rommel, Playa del Rey, Calif., assignor to The Garrett Corporation, Airesearch Manufacturing Company division, Los Angeles, Calif., a corporation of California Application June 21, 1943, Serial No. 491,619

7 Claims. (Cl. 73—37)

My invention relates to a method and means for testing tubes, and makes possible the testing of tubes for strength, leakage, and weight in a single operation.

Although the invention may be used for testing of different types of tubes, it is especially useful for the testing of thin walled tubes such as employed in intercoolers, heat exchangers, and oil coolers of the type now used in aircraft. In these heat exchange devices, drawn tubes of copper or aluminum are disposed in side by side relation so as to extend through a space or chamber wherein one fluid will engage the outer faces of the tubes while another fluid is passed through the interiors of the tubes in heat exchange relation thereto. It is a practice to test these tubes after they have been assembled in a core, and, if faulty tubes are found, it is necessary to remove and replace them, or, in some instances, to plug them, such operations being tedious, expensive, and time-consuming. It is an object of the present invention to provide a simple and effective method and means for testing tubes prior to their assembly in a core or in a heat exchanger, thereby greatly reducing the amount of repair work to be done in the manufacture of heat exchangers of this type. For example, a core for an intercooler, having flattened tubes, may, upon test after its assembly, be found to have one or more leaky tubes, or tubes which have failed structurally. It is then necessary to pull the faulty tube or tubes from the assembly and replace the same with new tubes assumed to be perfect. After the assembly is thus repaired, it is necessary to again test the same to determine whether the new tubes placed therein for the purpose of repair are without fault. The foregoing naturally delays the completion of the intercooler in which the core is to be employed and the production of intercoolers and other heat exchange devices is materially slowed down by these operations, made necessary through the inadvertent use of faulty tubes in the tube assembly.

It is an object of the invention to provide a method and means whereby the ends of the tubes to be tested are provided with closures which will seal the ends of the tubes against entry of fluid into the tube interiors, and whereby the sealed tubes are subjected to external hydraulic pressure so that the tubes will be subjected to forces tending to collapse the same, and to liquid under pressure which will pass through cracks or other openings in the tube walls into the tube interiors. According to the present invention, the end sealing members trap air within the tube to be tested. This sealing of the tubes causes them to float in liquid and a definite check of wall thickness comparison may be made by observing the flotation level at the start of the testing operation. After the flotation of the tubes has been observed, the tubes are submerged in the liquid and pressure is applied to the liquid. This pressure can be of any selected value. For example, it can be just equal to that which the tubes will encounter in service, or may be increased above this value in keeping with the factor of safety selected. The pressure on the liquid is released after a short period of time and the tubes are again observed to note whether any of them have been collapsed due to the applied external pressure, or whether any of them have become filled with liquid as a result of leakage. Those tubes which have been collapsed or into which liquid has leaked will not float on the liquid and therefore the acceptable tubes which float on the liquid may be readily distinguished and separated from the faulty tubes.

It is a further object of the invention to provide a device having a chamber to receive tubes to be tested and for controlling the quantity and pressure of a liquid in this chamber so that the tubes may be first subjected to flotation, then to submersion in liquid under selected testing pressure, and finally to the flotation effects of the liquid so that acceptable tubes may be readily separated from tubes indicated faulty by the test.

A further object of the invention is to provide a simple and effective sealing means for the ends of tubes to be tested, so formed that the effectiveness of the seal will be increased in accordance with the pressure applied.

Further objects and advantages of the invention will be brought out in the following part of the specification.

Referring to the drawing which is for illustrative purposes only,

Fig. 1 is a view showing an oil cooler tube with closures applied to the ends thereof.

Fig. 2 is an enlarged cross section taken as indicated by the line 2—2 of Fig. 1.

Fig. 3 is an enlarged fragmentary sectional view showing the manner of applying the closure to the end of the tube.

Fig. 4 is a schematic view showing my new testing apparatus.

The tube 10 shown in Fig. 1 is of the type extensively employed in oil coolers. It has a slender cylindrical body portion 11 with hexagonal enlargements 12 at the ends thereof. The first step in carrying out the process forming a part of my invention is to apply closures 13 to the ends of the tube 10 so that liquid cannot enter the interior of the tube 10 through the end openings thereof.

The closures 13 each comprises a wall 14 arranged to make sealing engagement with the wall 15 of the tube 10. The walls 14 are preferably so disposed that the application of liquid pressure thereto will increase the effectiveness of the seal. The wall 14 is shown as forming a part of a rubber cup 16 having an end wall 17 which is disposed in a plane perpendicular to the axis of the cup 15 and is gripped between two tapered guide members 18 which are secured in axial alignment and are caused to pressurally engage the wall 17 of the cup 16 by a short threaded stud 19. When the closure 13 is applied to the end of a tube, one of the guide members 18 projects into the end of the tube as shown at the left of Fig. 1 and as shown in Fig. 3, while the other of the members 18 projects outwardly in the manner of an extension or handle. When the closure 13 is applied, the rubber wall 14 is held by tension therein against the outer face of the hexagonal wall 12 of the tube end so as to make sealing engagement therewith. When pressure is externally applied to the tube 10 and to the closure 13, this pressure forces the wall 14 more tightly against the hexagonal wall 12 of the tube so that the effectiveness of the seal is increased in proportion to the increase in external fluid pressure applied.

As shown in Fig. 3, each guide member 18 has a peripherally rounded radial flange 20 of a diameter slightly greater than the greatest diametral dimension of the hexagonal enlargement 12 of the tube 10. A feature of the closure 13 is that it may be rapidly applied to the end of the tube. As shown in Fig. 3, the closure 13 is first applied to the tube end with the cup 15 surrounding a portion of the member 18 which projects outwardly from the end of the tube when the member 18 not enclosed by the wall 14 of the cup is inserted in the end of the tube 10. The wall 14 of the cup 15 is then rolled back over the flange 20 which engages the extremity of the tube enlargement 12, as indicated by dotted lines 21, so that it will then occupy the position, as indicated by dotted lines 22, surrounding the wall 15 of the enlargement 12, and as further shown in Fig. 1. The closure is removed, after completion of the test, by sliding the enclosing wall 14 off the wall 15 of the enlargement 12, and when the closure is to be applied to another tube end, it is merely turned end for end.

The further testing apparatus employed in, and forming a part of, my invention includes a pressure chamber 23, as shown in Fig. 4. This pressure chamber 23 is of a depth somewhat greater than the length of the tubes to be tested. It has a detachable cover 24 shown as being held in fluidtight closing relation by swing bolts 25. A reservoir 26 for liquid, preferably water, is provided, and a pump 27 driven by a motor 28 is arranged to draw water from the reservoir 26 through a pipe 29 and force the same through piping 30 into the pressure tank or chamber 23. Pressure return piping 31, having a relief or drain valve 32 therein, connects the lower portion of the chamber 23 with the reservoir 26.

In carrying out the process, tubes 10 with closures 13 applied are placed in the chamber 23 and a sufficient quantity of water is fed into the chamber, while its cover 24 is removed, to float the tubes. The flotation of these tubes is observed, after which the cover 24 is secured in place as shown in Fig. 4. Then the operation of the pump 27 is continued to force additional water into the chamber 23 to substantially fill the same and to apply the desired hydraulic testing pressure to the interior of the chamber 23 and to the exterior of the tubes which have been placed therein, such pressure being noted on a gauge 33 which is connected to the chamber 23. The pressure at this time built up in the chamber 23 depends upon the test to be conducted. If the test is for leakage only, the pressure need not be high, but if the test is to be for both leakage and physical strength of the tube, the pressure selected should be greater than the pressure which will be encountered by the tubes when in use in a heat exchange device. Ordinarily, the chamber is held under pressure for about thirty seconds to one minute, after which the pressure is released by opening the valve 32. The cover 24 is then removed and the tubes are observed to note the state of the same. Those which have not leaked or which have not been collapsed by the pressure applied will continue to float; whereas, the tubes which have failed to meet the test either through leakage or collapse will be found to have sunk to the bottom of the tube-receiving space of the chamber and may be lifted from the chamber by raising a perforate basket 34 provided for this purpose.

In the preferred form of the equipment shown in Fig. 4, the piping 30 includes a check valve 35 which will prevent in the chamber 23 a reduction in pressure as a result of a return flow through the piping 30 after the pump is stopped. The piping 30 also has therein a tank pressure valve 36 which may be completely closed, and between the valve 36 and the pump, a bypass pipe 37 may be extended to the reservoir, this bypass pipe having therein a pressure setting valve 38. The valve 38 is a two-way valve and may be of any well known conventional construction. The pump 27 is preferably of positive displacement type and the motor 28 may be connected thereto so as to drive the pump at constant speed. The pressure characteristics of the pumping means provided by my invention may be pre-set by closing the valve 36 and then operating the pump so as to discharge through the bypass pipe 37 into the reservoir 26. The valve 38 may be then gradually closed until a pressure gauge 39, connected to the pipe 30, indicates that the desired pressure has been produced in the portion of the pipe 30 lying to the left of the valve 36 as the result of the reaction to the flow of water through the bypass 37 resulting from the reduction in the orifice of the valve 38. This valve 38 may be an adjustable relief valve having a closure urged toward the valve seat by an adjustable spring, thereby providing a safety means which will assure against building up a dangerous pressure in the testing equipment.

An advantage of my invention is that in testing of tubes for use in oil cooler and water radiators, it applies the test pressures on the sides of the tubes which will be subjected to pressure when the completed unit is in normal operation. It also detects instantly any such type of flapper cracks which have been found in copper tubes. A characteristic feature of the present device and method is that in the use thereof, pressure is applied externally of the tubes, whereas in the customarily employed testing devices, the test pressure is applied internally of the tubes and does not bring to light certain types of imperfection. By use of the invention, single tubes or batches of tubes may be tested, and sample tubes may be readily tested for maximum collapsing pressure. To perform this test it is only necessary to seal the tubes and place them within the tank, as stated above, and then apply a gradually increasing pressure until the gauge gives a rapid deflection in downward direction, indicating a sudden release in pressure at the time of collapse of the tubes.

I claim as my invention:

1. A method of testing tubes, comprising: closing and sealing the ends of the tubes against entry of liquid thereinto through the end openings of the tubes; submerging the tubes in a body of liquid and applying pressure to the liquid whereby collapsing force will be applied to the exteriors of the tubes and the liquid will be forced into the interiors of the tubes through any openings which may be present in the walls of the tubes; releasing the pressure from the liquid; and observing the condition of the tubes as to flotation.

2. A method of testing a tube of the character described for leakage, comprising: closing and sealing the ends of the tube against entry of liquid into the tube through the ends thereof; placing the tube in liquid under a pressure sufficient to cause entry of liquid through openings in the wall of the tube; and then observing the tube for the purpose of determining if the weight thereof has been increased by the leakage of liquid thereinto.

3. In a device for testing tubes, the combination of: a tank member forming a testing chamber; means to close and seal said chamber; a reservoir connected to said chamber through piping having a relief valve therein; a positive displacement pump having its intake connected to said reservoir; power means for driving said pump; delivery piping connecting the discharge of said pump to said chamber; a check valve in said delivery piping; a shut-off valve in said delivery piping; a valved bypass connecting said delivery piping with said reservoir between said shut-off valve and said pump; and a pressure gauge connected to said delivery piping between said shut-off valve and said pump.

4. A closure for sealing the end of a tube to be tested, comprising: an annular wall of rubbery material to surround and make sealing engagement with the end of the tube to be tested, a transverse wall extending across the end of said annular wall so as to also extend across and close the end opening of the tube, and a pair of elongated members projecting in opposite directions from said transverse wall, said annular wall of rubbery material being adapted to be rolled from a position surrounding a portion of one of said elongated members to a position surrounding a portion of the other of said elongated members.

5. Apparatus for the pressure testing of tubes comprising: means defining a testing chamber adapted to contain a liquid under tube testing pressure, said means including an openable and sealable closure for said chamber; means for delivering liquid under tube testing pressure into said chamber; a gauge for indicating the pressure within said chamber; a pressure relief valve adapted, at the predetermined testing pressure, to divert from the chamber the liquid coming from said delivering means; and means for releasing liquid from said chamber.

6. Apparatus for the pressure testing of tubes, comprising: means defining a testing chamber adapted to contain a liquid at fluid testing pressure, said means defining in said chamber an opening through which a number of the tubes may be inserted into said chamber and including an openable closure for sealing said opening; a positive displacement pump for delivering liquid under pressure into said chamber; gauge means for indicating the pressure in the chamber; a pressure relief valve adapted, at the predetermined testing pressure, to divert from said chamber the flow of liquid coming from said pump, said relief valve being adjustable for the selection of the testing pressure; and means for releasing liquid from said chamber.

7. Apparatus for the pressure testing of tubes, comprising, in combination: a plurality of closures for sealing the ends of each tube, said closures each comprising an annular wall of stretchable, elastic, material adapted to encircle and to make sealing engagement with an end of the tubes and to have said sealing engagement made more secure by the pressure of liquid applied externally to said tubes, and means carried by each of said annular walls for closing the respective end opening of a tube.

WILLIAM G. ROMMEL.